United States Patent
Eichenberger et al.

(10) Patent No.: US 7,806,011 B2
(45) Date of Patent: Oct. 5, 2010

(54) BALANCED BEARING ASSEMBLY

(75) Inventors: David Eichenberger, Sanford, NC (US);
Jeremy Odell, Bryan, OH (US);
Spencer Zeedyk, Bryan, OH (US);
Darin Thorp, Montpelier, OH (US)

(73) Assignee: Ingersoll Rand Company, Montvale, NJ (US)

( * ) Notice: Subject to any disclaimer, the term of this patent is extended or adjusted under 35 U.S.C. 154(b) by 813 days.

(21) Appl. No.: 11/747,971

(22) Filed: May 14, 2007

(65) Prior Publication Data

US 2008/0282820 A1 Nov. 20, 2008

(51) Int. Cl.
*F02N 1/00* (2006.01)
(52) U.S. Cl. ............. 74/6; 29/888.02; 123/179.31; 415/229
(58) Field of Classification Search ............. 74/6; 29/888.02, 898.09; 123/179.31; 415/229; 384/517, 518, 563
See application file for complete search history.

(56) References Cited

U.S. PATENT DOCUMENTS

| | | | |
|---|---|---|---|
| 1,598,820 A | | 9/1926 | Hillmer |
| 1,760,988 A | | 6/1930 | Lansing |
| 1,906,464 A | * | 5/1933 | Cyrus ............ 418/182 |
| 2,113,116 A | * | 4/1938 | McMillan ............ 415/128 |
| 2,441,990 A | | 5/1948 | Calhoun |
| 2,552,840 A | * | 5/1951 | Burke et al. ............ 418/266 |
| 2,909,166 A | | 10/1959 | Cluff et al. |
| 3,010,443 A | | 11/1961 | Lyvers |
| 3,309,965 A | * | 3/1967 | Weickgenannt ............ 418/69 |
| 3,642,389 A | * | 2/1972 | Chambers et al. ............ 418/107 |
| 3,719,440 A | * | 3/1973 | Snider ............ 418/266 |
| 3,791,365 A | | 2/1974 | Pharr et al. |
| 3,804,562 A | * | 4/1974 | Hansson ............ 418/107 |
| 4,080,541 A | | 3/1978 | Mazzorana |
| 4,126,113 A | | 11/1978 | Sarro et al. |
| 4,362,065 A | | 12/1982 | Baratti |
| 4,898,524 A | * | 2/1990 | Butzen ............ 418/136 |
| 4,911,610 A | * | 3/1990 | Olschewski et al. ............ 415/170.1 |
| 5,045,737 A | | 9/1991 | Yamauchi |
| 5,105,670 A | | 4/1992 | Isozumi et al. |

(Continued)

FOREIGN PATENT DOCUMENTS

GB 1457763 12/1976

(Continued)

*Primary Examiner*—William C Joyce
(74) *Attorney, Agent, or Firm*—Michael Best & Friedrich LLP (57) ABSTRACT

An engine starter includes a motor housing having an inlet and an outlet for a motive fluid, a fluid-driven motor within the motor housing, the motor including a rotor and a stator, the stator directing a flow of fluid over the rotor, thereby inducing rotation of the rotor about an axis and exerting an axial force on the rotor and an output shaft operably coupled to the rotor such that rotation of the rotor drives rotation of the shaft about the axis. A front and a rear ball bearing assembly support the rotor. A front biasing member is pre-loaded to exert a first biasing load on the front ball bearing assembly and a rear biasing member is pre-loaded to exert a second biasing load on the rear ball bearing assembly in opposition of the axial force exerted on the rotor. The biasing members distribute the axial force between the two ball bearing assemblies.

15 Claims, 6 Drawing Sheets

U.S. PATENT DOCUMENTS

| | | | |
|---|---|---|---|
| 5,134,330 A | 7/1992 | Haas et al. | |
| 5,146,797 A | 9/1992 | Annovazzi et al. | |
| 5,163,335 A | 11/1992 | Isom et al. | |
| 5,267,539 A | 12/1993 | Becker et al. | |
| 5,281,115 A | 1/1994 | Timuska | |
| 5,329,896 A | 7/1994 | Everts | |
| 5,767,585 A | 6/1998 | Shiga et al. | |
| 5,800,122 A * | 9/1998 | Blattmann | 415/229 |
| 5,831,340 A | 11/1998 | Kobayashi et al. | |
| 5,834,852 A | 11/1998 | Katoh et al. | |
| 5,836,739 A | 11/1998 | Haramura et al. | |
| 5,847,471 A | 12/1998 | Morishita et al. | |
| 6,559,566 B2 | 5/2003 | Modi et al. | |
| 6,633,099 B2 | 10/2003 | Fulton et al. | |
| 6,731,037 B1 | 5/2004 | Kim et al. | |
| 6,817,258 B2 | 11/2004 | Kajino et al. | |
| 6,834,630 B1 | 12/2004 | Mueller et al. | |
| 6,930,430 B2 | 8/2005 | Shiga et al. | |
| 6,969,235 B2 | 11/2005 | Feest | |
| 2004/0237677 A1 | 12/2004 | Inagaki | |

FOREIGN PATENT DOCUMENTS

| | | |
|---|---|---|
| GB | 2187235 A | 9/1987 |
| GB | 2267539 A | 12/1993 |
| JP | 4183242 A | 6/1992 |
| JP | 10089203 A | 4/1998 |

* cited by examiner

BALANCED BEARING ASSEMBLY

FIELD

The present invention relates to starters for internal combustion engines. More particularly, the invention relates to bearing arrangements for starters.

BACKGROUND

Internal combustion engines are typically provided with starter systems for initiating operation of the engine. Starter systems often include an air motor driven by pressurized air and a gear system. Pressurized air is introduced to the air motor, causing a rotor to rotate. The rotor, which has a higher number of revolutions per minute (rpm) than what is needed to start the engine, is connected to the gear system, which includes one or more speed reducing gears configured to match the air motor rpm to the engine rpm. The reducing gears drive an output device such as a pinion, which is coupled to the engine. Rotation of the pinion in turn rotates the engine, initiating operation of the engine.

The force of the pressurized air or other fuel used to operate the starter system on the rotor can generate an axial load on the rotor that can more rapidly fatigue the rotor and other parts of the starter system. The bearing on which the rotor rotates may be able to withstand the axial load without excessive wear on the bearing or other parts. In other starter system configurations, where the axial load is considerable, specialized bearing configuration may be provided to overcome or compensate for the axial load. For example, larger bearings, double or stacked bearings, or angular contact bearings may be used. However, larger bearings and double or stacked bearings are not always useful due to space restrictions, and angular contact bearings are not always feasible due to cost constraints.

SUMMARY

In one embodiment, the invention provides an engine starter including a motor housing having an inlet for receiving a fluid and an outlet for exhausting the fluid, a fluid-driven motor within the motor housing, the motor including a rotating mass and a stator, the stator directing a flow of fluid over the rotating mass, thereby inducing rotation of the rotating mass about an axis and exerting an axial force on the rotating mass. A front ball bearing assembly supports a front portion of the rotating mass rotatably about the axis and a rear ball bearing assembly supports a rear portion of the rotating mass rotatably about the axis. A front biasing member is pre-loaded to exert a first biasing load on the front ball bearing assembly relative to the motor housing in opposition of the axial load exerted on the rotating mass. A rear biasing member is pre-loaded to exert a second biasing load on the rear ball bearing assembly and the rotating mass relative to the motor housing in opposition of the axial force exerted on the rotating mass. The first biasing load is approximately one third of the axial force exerted on the rotating mass.

In another embodiment, the invention provides an engine starter including a motor housing having an inlet for receiving a fluid and an outlet for exhausting the fluid, a fluid-driven motor within the motor housing, the motor including a rotating mass and a stator, the stator directing a flow of fluid over the rotating mass, thereby inducing rotation of the rotating mass about an axis and exerting an axial force on the rotating mass. A front ball bearing assembly supports a front portion of the rotating mass rotatably about the axis and a rear ball bearing assembly supports a rear portion of the rotating mass rotatably about the axis. A front biasing member is pre-loaded to exert a first biasing load on the front ball bearing assembly relative to the motor housing in opposition of the axial load exerted on the rotating mass. A rear biasing member is pre-loaded to exert a second biasing load on the rotating mass and the rear ball bearing assembly relative to the motor housing in opposition of the axial force exerted on the rotating mass. The second biasing load is about two thirds of the axial force exerted on the rotating mass.

In another embodiment the invention provides a method of operating an engine starter. The method includes directing a flow of fluid over a rotating mass, the flow of fluid inducing rotation of the rotating mass about an axis and exerting an axial force on the rotating mass. The method also includes supporting a front portion of the rotating mass for rotation on a front ball bearing assembly and supporting a rear portion of the rotating mass for rotation on a rear ball bearing assembly. A first axial load is exerted on an outer race of the front ball bearing assembly of about one third the axial force in opposition of the axial force and a second axial load is exerted on an outer race of the rear ball bearing assembly and the output shaft of about two thirds the axial force in opposition of the axial force.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
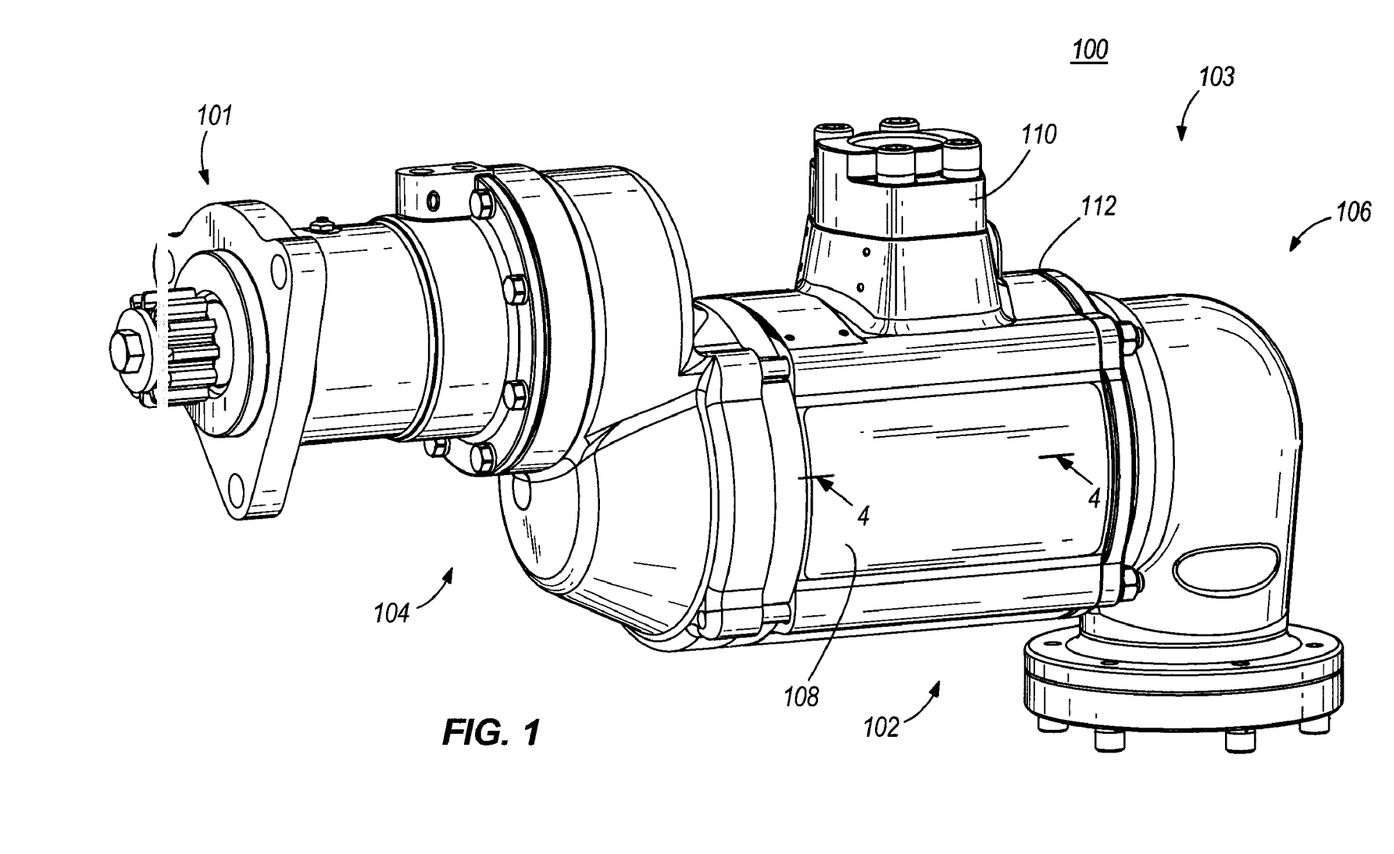
FIG. 1 is a perspective view of an engine starter system according to an embodiment of the invention.
Figure 2:
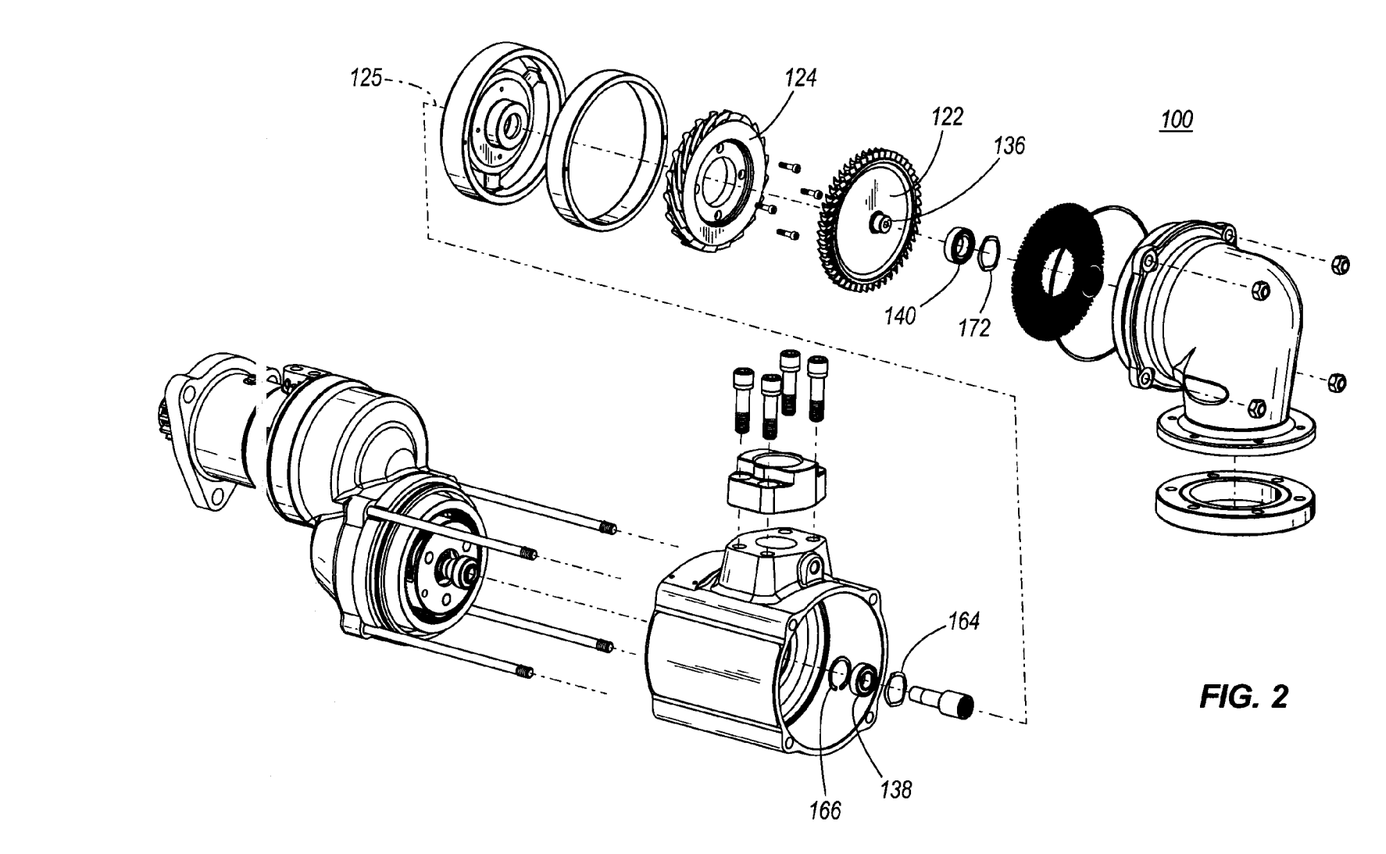
FIG. 2 is an exploded view of the engine starter system of FIG. 1.
Figure 3:
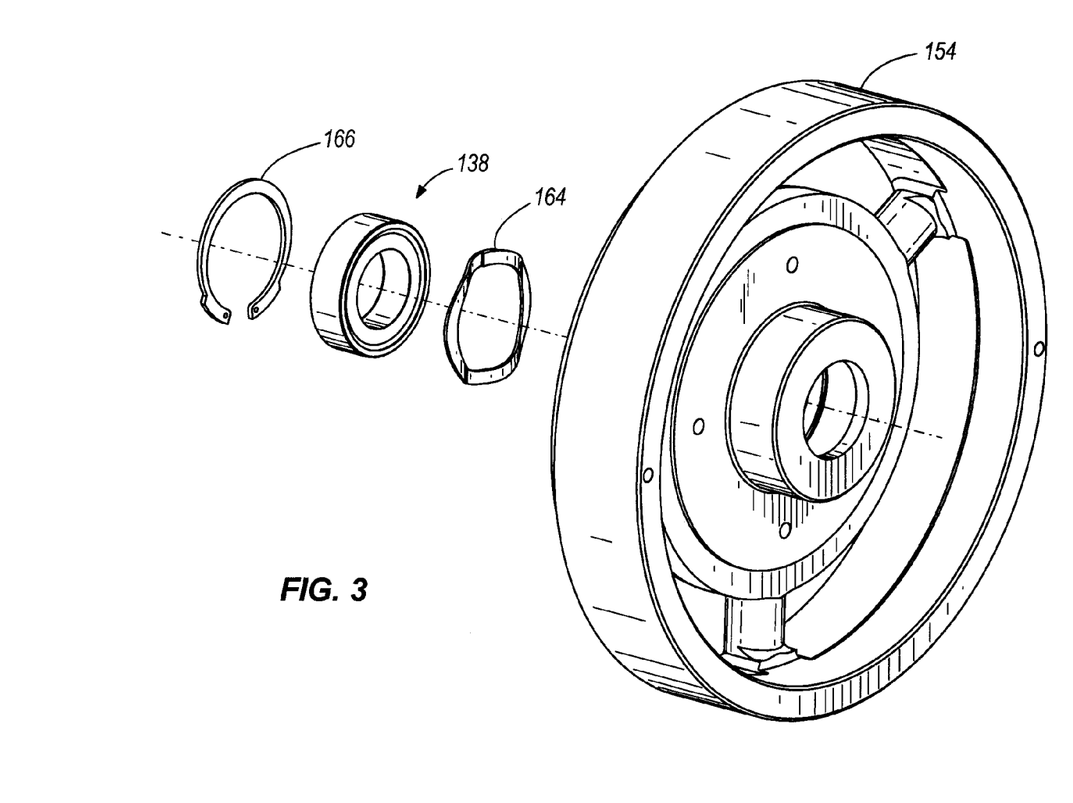
FIG. 3 is an exploded view of a portion of the engine starter system of FIG. 1.

FIGS. 1-2 illustrate a starter system 100 according to one embodiment of the invention. Starter system 100 can couple to an engine (not shown) for providing start-up cranking of the engine. Starter system 100 can be used with any type of engine, including but not limited to, internal combustion engines, diesel engines, and turbine and microturbine engines.

Starter system 100 can include an air motor module 102, a gear module 104 and motive fluid outlet 106. The gear module 104 is at the front 101 of the starter system 100 oriented toward the engine while the motive fluid outlet 106 is at the rear of the starter system 100 away from the engine 101. The air motor module 102 can include an air motor housing 108 with a motive fluid inlet 110 for receiving a motive fluid, such as pressurized air, into the air motor housing 108, and a service aperture 112 at one end of the housing 108.

With reference to FIG. 2, the air motor module 102 can further include a rotor 122 and a stator 124 arranged along a longitudinal axis 125. The stator 124 can direct the flow of motive fluid against the rotor 122 to cause rotation of the rotor 122 with respect to the stator 124. In one example, the motive fluid may be provided in the range of 30-150 psig, the stator 124 may act as a supersonic nozzle, and the rotor 122 may be designed to have a free turbine or "run away" speed of 65,000 rpm. The rotor 122 can be interconnected with the gear module 104 via, for example, an air motor shaft 134. In the illustrated embodiment, a secondary or stub shaft 136 is coupled to the rotor 122 opposite the air motor shaft 134, and in this regard, the term "output shaft" may be applied to the combination of the air motor shaft 134 or "front output shaft" and the stub shaft 136 or "rear output shaft." In some embodiments, the rotor 122, the air motor shaft 134 and the stub shaft 136 are integrally formed with one another. The rotor 122, air motor shaft 134, and stub shaft 136 comprise a rotating mass of the motor 102.

Figure 4:
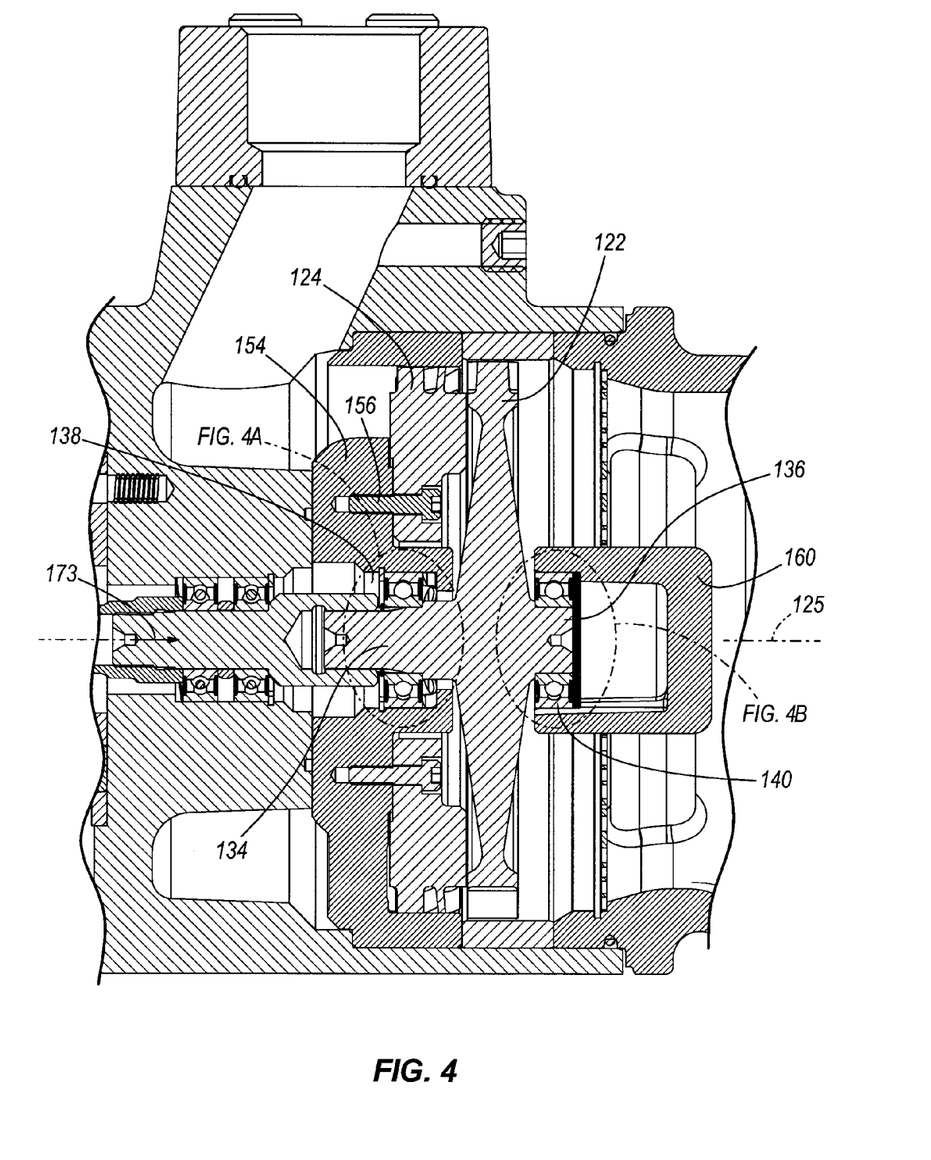
FIG. 4 is cross-sectional view of a portion of the engine starter system of FIG. 1 taken along line 4-4.
Figure 4A:
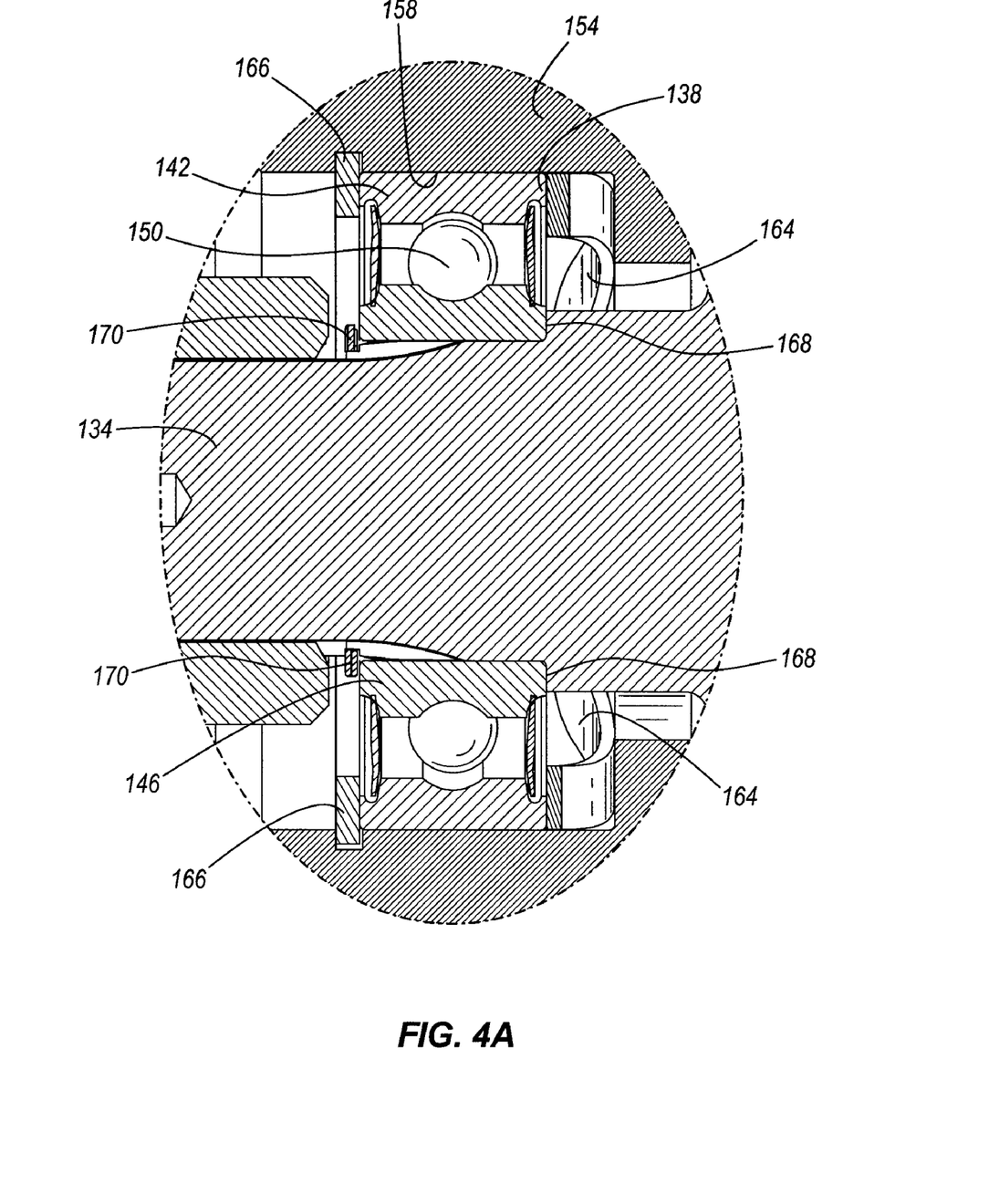
FIG. 4A is an expanded view of a portion of the view of FIG. 4.
Figure 4B:
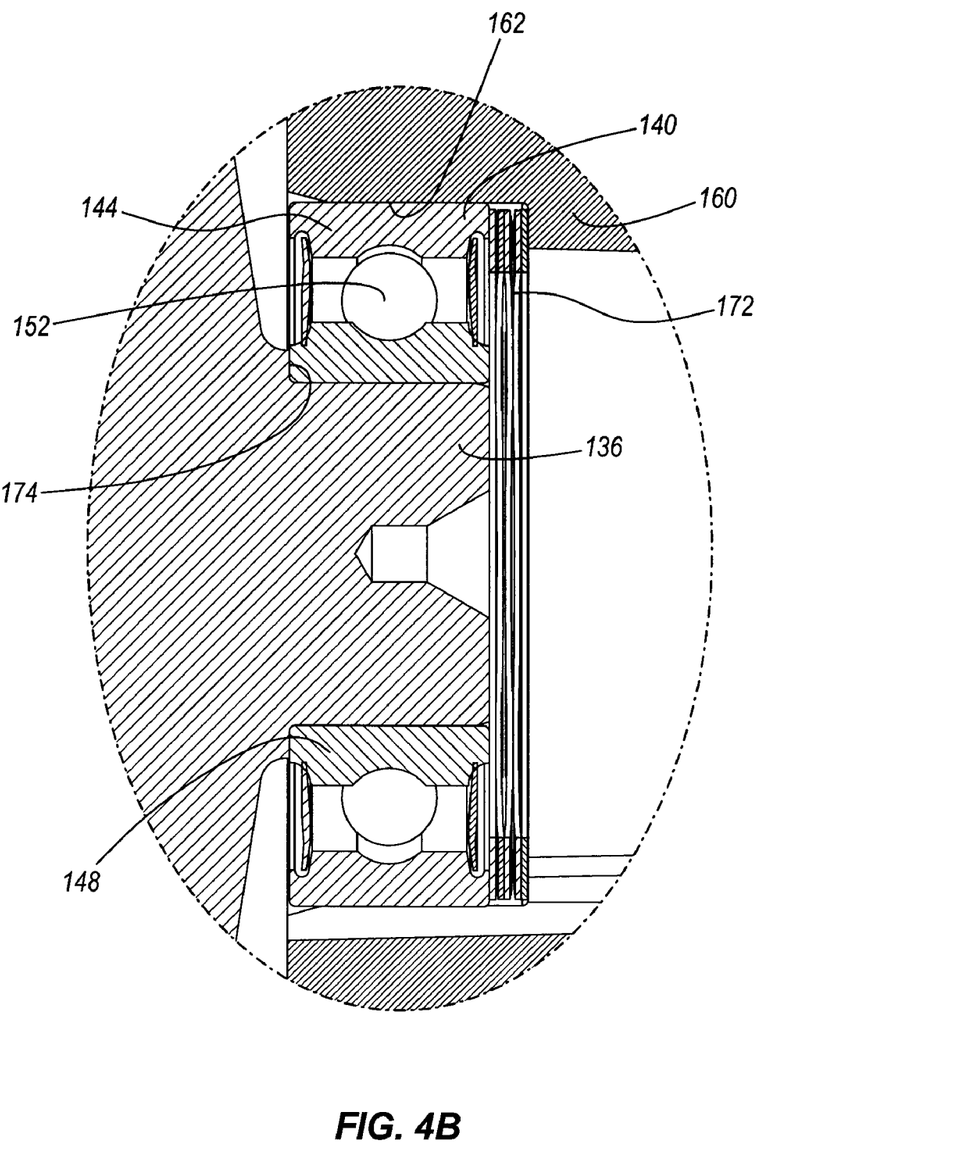
FIG. 4B is an expanded view of a portion of the view of FIG. 4.

The air motor shaft 134 is supported for rotation by bearings in the motor housing 108. As illustrated in FIG. 2, a first ball bearing assembly 138 supports the shaft 134 forward of the rotor 122 and a second ball bearing assembly 140 supports the stub shaft 136 rearward of the rotor 122. In one embodiment, the first and second ball bearing assemblies 138, 140 are deep groove radial ball bearing assemblies. Referring now to FIGS. 4A and 4B, each of the first and second ball bearing assemblies 138, 140 includes an outer race 142 (144), an inner race 146 (148) and a ball bearing 150 (152) press fit between the races. The outer race 142 (144) of each of the first and second ball bearing assemblies 138, 140 is coupled to a portion of the motor housing 108 and is stationary. The inner race 146 of the front ball bearing assembly 138 is coupled to the air motor shaft 134. The inner race 148 of the rear ball bearing assembly 140 is coupled to the stub shaft 136. The inner races 146 (148) rotate with the respective shafts 134, 136 relative to the outer races 142 (144) over the ball bearings 150 (152).

Referring now to FIG. 4A, the first ball bearing assembly 138 is supported by a pre-load housing 154. The pre-load housing 154 is secured to the stator 124 with fasteners 156 and has a bore through which the air motor shaft 134 extends. An inner diameter 158 is formed on an inner periphery of the pre-load housing 154 for at least partially receiving the outer race 142 of the front ball bearing assembly 138.

Referring now to FIG. 4B, the second ball bearing assembly 140 is supported by a rear hub 160. The rear hub 160 is secured to the air motor housing 108 and has a blind bore into which the stub shaft 136 protrudes. The rear hub 160 includes an internal groove 162 formed on an inner periphery of the rear hub 160 for at least partially receiving the outer race 144 of the rear ball bearing assembly 140.

Each of the ball bearing assemblies 138, 140 is provided with a corresponding biasing member. The biasing members are arranged to exert a biasing load on the corresponding ball bearing assembly 138, 140 in opposition to an axial load exerted on the ball bearing assemblies 138, 140 by the rotor 122 under the influence of the fluid. The biasing members can be wave springs, Belleville washings, coil springs or any other member capable of exerted a spring bias.

A front biasing member 164 is disposed about the air motor shaft 134 rearward of the outer race 142 of the front ball bearing assembly 138. The front biasing member 164 acts against the pre-load housing 154 at the inner diameter 158 and the outer race 142. A retaining ring 166 secures the outer race 142 and the front biasing member 164 within the inner diameter 158 of the pre-load housing 154. The retaining ring 166 prevents the front ball bearing assembly 138 from moving forward (i.e., to the left in FIG. 1) under the influence of the loaded front biasing member 164. The outer race 142 is precision slip fit between the retaining ring 166 and the front biasing member 164. The inner race 146 of the front ball bearing assembly 138 is clamped between a shoulder 168 in the air motor shaft 134 and a snap ring 170 (see FIG. 4) coupled to the pre-load housing 154. When assembled with the front ball bearing assembly 138 in the pre-load housing 154, the front biasing member 164 is pre-loaded with a first biasing force.

The pre-load housing 154 can be a modular element of the starter 100. That is, to assemble the starter 100, the pre-load housing 154 can be separately assembled and then secured to the stator 124. To assemble the pre-load housing 154, the front biasing member 164 is dropped into the bore, then the front ball bearing assembly 138, then the snap ring 170, and then the retaining ring 166. Upon securing the retaining ring 166 to the pre-load housing 154, the outer race 142 is precision slip fit between the retaining ring 166 and the front biasing member 164 and the front biasing member 164 is pre-loaded. The assembled pre-load housing 154 can then be dropped over the air motor shaft 134 and attached to the stator 124. Alternately, the pre-load housing 154 can be secured to the stator 124 first, and then the front ball bearing assembly 138 can be secured to the pre-load housing 154.

A rear biasing member 172 is disposed rearward of the outer race 144 of the rear ball bearing assembly 140. The rear biasing member 172 acts against the hub 160 and the outer race 144. The outer race 144 is precision slip fit between the rear biasing member 172 within the groove 162 of the hub 160. The inner race 148 of the rear ball bearing assembly 140 is clamped between a shoulder 174 in the stub shaft 136 and the hub 160. When assembled with the rear ball bearing assembly 140 in the hub 160, the rear biasing member 172 is pre-loaded with a second biasing force.

The flow of motive fluid over the rotor 122 primarily induces rotation of the rotor 122, and therefore the air motor shaft 134 and the stub shaft 136, about the axis 125. Sometimes, the flow of motive fluid or other factors induces a thrust or axial force on the rotor 122, and thus the air motor shaft 134 and stub shaft 136, along the axis 125 towards a rear of the starter 100, as indicated by arrow 173.

Under the influence of the axial force 173 exerted on the inner races of the ball bearing assemblies 138, 140 by the air motor shaft 134, the outer races 142, 144 can slide along the central axis by compressing the biasing members 164, 172. This axial movement is opposed by the pre-loading force on the biasing members in opposition of the axial force 173. Thus, some of the axial force 173 is absorbed by the biasing members 164, 172, depending on the pre-loading force applied to the biasing members 164, 172. When the axial force exceeds the pre-load forces, the biasing members 164, 172 collapse, and the remainder of the axial force 173 is absorbed by the ball bearing assemblies 138, 140.

The rear biasing member 172 applies a force equal to the second pre-loading force to the rear ball bearing assembly 140 and thus to the air motor shaft 134 in opposition of the axial force. Therefore, the front ball bearing assembly 138 absorbs the axial force 173 less the load that the rear biasing member 172 absorbs (i.e., the second preloading force applied to the rear ball bearing assembly 140 and the air motor shaft 134). Without the second biasing member 172, when the first biasing member 164 collapsed, the remaining axial force would be applied to the front and rear ball bearing assemblies 138, 140.

The second biasing member 172 exerts a pre-load on the air motor shaft 134 through the rear ball bearing assembly 140 in opposition of the axial force. The second pre-loading force therefore acts as an overall system or overall shaft pre-load. In contrast, the front biasing member 164 exerts a pre-load on the front ball bearing assembly 138 itself, resisting sliding movement of the outer race 142 along the axis 125 under the influence of the axial force exerted on the inner race 146 by the air motor shaft 134.

The pre-loading force on the front and rear biasing members 164, 172 can be arranged to distribute the axial force between the front and rear ball bearing assemblies 138, 140. In one embodiment, the front biasing member 164 is pre-loaded with a force of about one third the expected axial load. In one embodiment, the rear biasing member 172 is pre-loaded with a force of about 20 lbs. In one embodiment, the first and second biasing members 164, 172 are pre-loaded such that the front ball bearing assembly 138 absorbs about 70% of the axial load and the rear ball bearing assembly 140 absorbs about 30% of the axial load. A thrust or axial force sharing arrangement is thereby provided, in which the axial force applied to the rotor 122 under the influence of the motive fluid is shared between the front and rear ball bearing assemblies 138, 140.

Thus, the invention provides, among other things, a starter having front and rear ball bearing assemblies for supporting rotation of a rotor and compensating for an axial load. Various features and advantages of the invention are set forth in the following claims.

What is claimed is:

1. A engine starter comprising:
    a motor housing having an inlet for receiving a fluid and an outlet for exhausting the fluid;
    a fluid-driven motor within the motor housing, the motor including a rotating mass and a stator, the stator directing a flow of fluid over a portion of the rotating mass, thereby inducing rotation of the rotating mass about an axis and exerting an axial force on the rotating mass;
    a front ball bearing assembly supporting a front portion of the rotating mass about the axis and a rear ball bearing assembly supporting a rear portion of the rotating mass rotatably about the axis;
    a front biasing member pre-loaded to exert a first biasing load on the front ball bearing assembly relative to the motor housing in opposition of the axial load exerted on the rotating mass; and
    a rear biasing member pre-loaded to exert a second biasing load on the rear ball bearing assembly and the rotating mass relative to the motor housing in opposition of the axial force exerted on the rotating mass, the first biasing load being approximately one third of the axial force exerted on the rotor.

2. The engine starter of claim 1, wherein the front and rear ball bearing assemblies are deep groove radial ball bearing assemblies.

3. The engine starter of claim 1, wherein the front ball bearing assembly includes an outer race, an inner race and a ball press-fit between the outer race and the inner race, wherein the outer race is coupled to the stator and the inner race is coupled to the rotating mass.

4. The engine starter of claim 3, wherein the outer race is precision slip fit between an outer retaining ring and the front biasing member.

5. The engine starter of claim 4, wherein the outer retaining ring is mounted to a hub, the hub being mounted to the stator.

6. The engine starter of claim 1, wherein the rotating mass includes an output shaft, wherein the rear ball bearing assembly includes an outer race, an inner race and a ball press-fit between the outer race and the inner race, and wherein the outer race is coupled to the motor housing and the inner race is coupled to the output shaft.

7. The engine starter of claim 1, wherein the rotating mass includes a front output shaft coupled to a front face of a rotor and supported for rotation by the front ball bearing assembly and a rear output shaft coupled to a rear face of the rotor and supported for rotation by the rear ball bearing assembly.

8. The engine starter of claim 1, wherein the front and rear biasing members are each one of a wave spring, a belleville washer or a coil spring.

9. The engine starter of claim 1, wherein the rear bearing assembly absorbs the axial force less the first biasing load.

10. The engine starter of claim 1, wherein the second biasing load is approximately 20 lbs.

11. The engine starter of claim 1, wherein the front ball bearing assembly absorbs about 30% of the axial force and the rear ball bearing assembly absorbs about 70% of the axial force.

12. A engine starter comprising:
    a motor housing having an inlet for receiving a fluid and an outlet for exhausting the fluid;
    a fluid-driven motor within the motor housing, the motor including a rotating mass and a stator, the stator directing a flow of fluid over the rotating mass, thereby inducing rotation of the rotating mass about an axis and exerting an axial force on the rotating mass;
    a front ball bearing assembly supporting a front portion of the rotating mass rotatably about the axis and a rear ball bearing assembly supporting a rear portion of the rotating mass rotatably about the axis;
    a front biasing member pre-loaded to exert a first biasing load on the front ball bearing assembly relative to the motor housing in opposition of the axial load exerted on the rotating mass; and
    a rear biasing member pre-loaded to exert a second biasing load on the rotating mass and the rear ball bearing assembly relative to the motor housing in opposition of the axial force exerted on the rotating mass, the second biasing load being about two thirds of the axial force exerted on the rotating mass.

13. A method of operating an engine starter, the method comprising:

directing a flow of fluid over a rotating mass, the flow of fluid inducing rotation of the rotating mass about an axis and exerting an axial force on the rotating mass;

supporting a front portion of the rotating mass shaft for rotation on a front ball bearing assembly and supporting a rear portion of the rotating mass for rotation on a rear ball bearing assembly;

pre-loading a front biasing member against the front ball bearing assembly to apply a load of about one third the axial force exerted by the flow of fluid on the rotating mass in opposition to the axial force; and pre-loading a rear biasing member against the rear ball bearing assembly to apply a load of about two third the axial force exerted by the flow of fluid on the rotating mass in opposition to the axial force.

14. The method of claim 13, wherein at least one of the biasing members is one of a wave spring, a belleville washer or a coil spring.

15. The method of claim 13, wherein pre-loading the rear biasing member includes applying a load of about 20 lbs.

* * * * *